United States Patent
Scannell et al.

(10) Patent No.: US 12,499,998 B2
(45) Date of Patent: Dec. 16, 2025

(54) METHOD AND SYSTEM FOR ESTIMATING ARTERIAL INPUT FUNCTION

(71) Applicant: King's College London, London (GB)

(72) Inventors: Cian Scannell, London (GB); Amedeo Chiribiri, London (GB)

(73) Assignee: King's College London, London (GB)

( * ) Notice: Subject to any disclaimer, the term of this patent is extended or adjusted under 35 U.S.C. 154(b) by 77 days.

(21) Appl. No.: 18/028,779

(22) PCT Filed: Sep. 29, 2021

(86) PCT No.: PCT/GB2021/052519
§ 371 (c)(1),
(2) Date: Mar. 28, 2023

(87) PCT Pub. No.: WO2022/069883
PCT Pub. Date: Apr. 7, 2022

(65) Prior Publication Data
US 2023/0253110 A1 Aug. 10, 2023

(30) Foreign Application Priority Data
Sep. 29, 2020 (GB) .................................... 2015381

(51) Int. Cl.
G16H 50/20 (2018.01)
G16H 30/40 (2018.01)
(52) U.S. Cl.
CPC ............. G16H 50/20 (2018.01); G16H 30/40 (2018.01)
(58) Field of Classification Search
CPC ................................ G16H 50/20; G16H 30/40
(Continued)

(56) References Cited

U.S. PATENT DOCUMENTS

| 2003/0045791 A1* | 3/2003 | Carroll | G01R 33/563 600/419 |
| 2014/0187928 A1* | 7/2014 | Mittal | A61B 5/026 600/431 |
| 2018/0306882 A1* | 10/2018 | Li | A61B 5/055 |

FOREIGN PATENT DOCUMENTS

| WO | 2017192629 A1 | 11/2017 | |
| WO | WO-2019220417 A1 * | 11/2019 | ........... G06T 7/0016 |
| WO | WO-2019243400 A1 * | 12/2019 | ............. G16H 50/20 |

OTHER PUBLICATIONS

Li-Yueh Hsu et al.; Comparison of arterial input function measured from dual-bolus and dual-sequence dynamic contrast-enhanced cardiac magnetic resonance imaging; Journal of Cardiovascular Magnetic Resonance 2011, 13(Suppl 1):O8; http://jcmr-online.com/content/13/S1/O8 (Year: 2011).*

(Continued)

*Primary Examiner* — Hiep V Nguyen
(74) *Attorney, Agent, or Firm* — Banner & Witcoff, Ltd.

(57) ABSTRACT

Examples of the present disclosure include a method and system for deriving a computer implemented trained artificial intelligence (AI) model that is capable of predicting arterial input function (AIF) from blood and myocardial signal intensity curves of a subject obtained using a magnetic resonance (MR) scanner during injection of a single high dosage bolus of contrast agent that would otherwise cause signal saturation. The method and system requires an input data set of a large number of prior obtained dual bolus or dual sequence sets of scan measurements to be used as training data for the AI model. Once the computer implemented trained AI model has been obtained, it is deployed in a further method and system which receives MR data for a particular subject for which myocardial perfusion parameters such as the AIF is to found, the MR data being obtained from an MR scan taken during injection of a single bolus of (Continued)

contrast agent at a concentration sufficient to give MR signal saturation. The trained AI model is then able to predict, from the single bolus saturated MR data, myocardial perfusion parameters such as the AIF for the subject. The trained AI model is also able to convert between dual bolus datasets and duals sequence datasets.

20 Claims, 5 Drawing Sheets

(58) Field of Classification Search
USPC .......................................................... 705/2
See application file for complete search history.

(56) References Cited

OTHER PUBLICATIONS

Sevakula et al.; State-of-the-Art Machine Learning Techniques Aiming to Improve Patient Outcomes Pertaining to the Cardiovascular System; Journal of the American Heart Association vol. 9, No. 4; Feb. 13, 2020 https://doi.org/10.1161/JAHA.119.013924 (Year: 2020).*

Dec. 8, 2021—(WO) International Search Report and Written Opinion—PCT/GB2021/052519.

Hess Andreas et al., "Synthetic Perfusion Maps: Imaging Perfusion Deficits in DSC-MRI with Deep Learning", Arxiv.org, Cornell University Library, Jun. 11, 2018.

Xue Hui et al., "Automated Inline Analysis of Myocardial Perfusion MRI with Deep Learning", Arxiv.org, Cornell University Library, pp. 2-7 and 11, Nov. 2, 2019.

Xue Hui et al., "Automated Detection of Left Ventricle in Arterial Input Function Images for Inline Perfusion Mapping using Deep Learning: A study of 15,000 Patients", Arxiv.org, Cornell University Library, pp. 2, 3 6-11, Oct. 16, 2019.

Mar. 21, 2021—Search Report—Application No. GB2015381.3—3 pages.

* cited by examiner

METHOD AND SYSTEM FOR ESTIMATING ARTERIAL INPUT FUNCTION

CROSS-REFERENCE TO RELATED APPLICATIONS

This application is a U.S. National Stage application under 35 U.S.C. § 371 of International Application PCT/GB2021/052519, filed Sep. 29, 2021, which claims the benefit of priority to United Kingdom Patent Application GB 2015381.3, filed Sep. 29, 2020. Benefit of the filing date of each of these prior applications is hereby claimed. Each of these prior applications are hereby incorporated by reference in their entirety.

TECHNICAL FIELD

The present invention relates to a method and system for estimating arterial input function, from which myocardial perfusion parameters such as, for example, myocardial blood flow in a human subject can be found, using a trained computer implemented artificial intelligence system.

BACKGROUND TO THE INVENTION AND PRIOR ART

As described in Ishida et al, Development of a universal dual-bolus injection scheme for the quantitative assessment of myocardial perfusion cardiovascular magnetic resonance Journal of Cardiovascular Magnetic Resonance, 2011, vol 13, no. 28, first-pass myocardial perfusion cardiovascular magnetic resonance (CMR) uses a series of T1-weighted images during the passage of a gadolinium contrast agent bolus through the heart to characterize myocardial blood flow (MBF). The use of fully quantitative analysis of first-pass myocardial perfusion CMR allows the absolute quantification of MBF in units of ml/min/g and may permit an accurate, objective assessment of altered myocardial perfusion in patients with heart disease. Accurate MBF quantification by myocardial first-pass perfusion CMR relies on a linear relationship between signal intensity and gadolinium concentration. However, it is well-known that with gadolinium concentrations currently in use for first-pass perfusion MR imaging, T1-saturation effects can cause substantial signal attenuation predominantly in the left ventricular (LV) cavity and in the aorta where the signal intensity-time curve usually represents the arterial input function (AIF). To preserve an accurate AIF, previous studies using quantitative measures have focused on low doses (0.025 mmol/kg-0.05 mmol/kg) of contrast agent in combination with strongly T1 weighted sequences. Low-dose techniques are applied for precise and reproducible absolute quantification of cardiac perfusion. However, this approach is limited by a low contrast to noise ratio (CNR) in the myocardial tissue as a result of limited myocardial enhancement. To overcome the limitation of T1-induced MR signal saturation in the LV blood pool and low CNR in the myocardial tissue, "dual-bolus" first-pass perfusion CMR methods were introduced to allow the use of high gadolinium concentration contrast for myocardial analysis, and a lower gadolinium concentration bolus to maintain the linearity of the LV signal intensity for the AIF. These techniques use a low dose of dilute contrast agent as a pre-bolus before the main bolus of neat contrast agent.

Such a "dual bolus" method was described by Ichihara et al in *Quantitative Analysis of First Pass Contrast Enhanced Myocardial Perfusion MRI Using a Patlak Plot Method and Blood Saturation Correction*, Magnetic Resonance in Medicine, Vol, 62, pp. 373-383, 7 Apr. 2009. It involves injecting a first bolus of low gadolinium concentration contrast agent at a level that does not cause MR signal saturation and obtaining blood and myocardial signal intensity curves of a subject using an MR scanner, and then injecting a second bolus of non-diluted gadolinium contrast agent, and repeating the measurements. The AIF measurements taken using this second bolus will saturate, but this saturation can be corrected using information from the measurements taken using the diluted first bolus. FIG. 1, taken from the Ichihara et al paper, illustrates the correction process.

FIG. 1 shows the correction of blood input function, with FIG. 1(a) showing blood and myocardial signal intensity curves before saturation correction, FIG. 1(b) showing conversion from saturated blood curve to nonsaturated blood curve using a lookup table, and FIG. 1 (c) showing blood signal intensity curves before and after saturation correction. As described by Ichihara et al, the blood time-signal intensity curve with saturation $(Ca(t)_{nondiluted}$ in (a)) is converted to the saturation-corrected curve ($Ca(t)$ in (c)) using the lookup tables (b). $Ca(t)_{nondiluted}$ denotes the blood time-signal intensity curve with saturation after the injection of nondiluted Gd-DTPA, and $Ca(t)$ denotes the saturation-corrected blood time-signal intensity curve. $Ca(tpeak)_{nondiluted}$ shows a peak at the time tpeak, and xpeak denotes the concentration of Gd-DTPA at the peak of $Ca(tpeak)_{nondiluted}$. First, the saturation ratio (SR) at peak enhancement was calculated as $SRpeak=10*SI10\%-diluted/SI_{nondiluted}$, which determines the concentration of Gd-DTPA at the peak, xpeak in FIG. 2. The y-axis in FIG. 6b is scaled in each subject so that the point O(xpeak) (2) in (b) corresponds to the point $Ca(tpeak)_{nondiluted}$ (3) in (a). Peak point (3) of blood input function, Ca(tpeak)non-diluted in (a) can be converted to the peak point (5) of the saturation-corrected blood input function, Ca(tpeak) in (c), by looking up a point (2) on O(xpeak) and finding a corresponding point (4) on N(xpeak) in (b). In addition to the peak point, the signal intensity of blood input function $Ca(t)_{nondiluted}$ at any time, a point (6) in (a) for example, can be converted to saturation-corrected Ca(t), a point (9) in (c), by using lookup a table that converts a point (7) on O(x) to a point (8) on N(x) in (b). (a.u.=arbitrary units). Further details and discussion of this saturation correction process are given in Ichihara et al, the entire contents of which are incorporated herein by reference.

Whilst the dual bolus method therefore gives the desired blood input function measurements, it does have drawbacks in that it is complicated and time consuming to perform, and in practice very prone to errors. In addition, complex motion correction schemes can also be needed to compensate for respiratory motion in the imaged subject, and longer acquisition times result.

The "dual sequence" method has been developed as an easier to use an alternative to the "dual bolus" method. The dual sequence method is based on the use of a dual saturation acquisition sequence (Figure A). In this approach, a short time to echo (TE) and short saturation time (i.e. 23.5 ms) is used to acquire a low-resolution AIF slice without signal saturation. The myocardial information is subsequently acquired with a standard higher resolution acquisition with longer saturation time (100-120 ms). The tracer-kinetic modelling can then be performed with the short saturation time AIF and the myocardial tissue curves from the standard acquisition slices.

The limitation of the dual sequence approach is the lack of availability of the pulse sequence for routine clinical use. There are several research prototypes developed in research laboratories but these are not commercially available of CE marked and therefore, the approach is limited to use in highly specialised centres. Example prior art discussing dual sequence MR scans include the following:

1. Sánchez-González J, Fernandez-Jiménez R, Nothnagel N D, López-Martín G, Fuster V, Ibañez B. Optimization of dual-saturation single bolus acquisition for quantitative cardiac perfusion and myocardial blood flow maps. *J Cardiovasc Magn Reson* (2015) 17:21. doi:10.1186/s12968-015-0116-2
2. Kellman P, Hansen M S, Nielles-Vallespin S, Nickander J, Themudo R, Ugander M, Xue H. Myocardial perfusion cardiovascular magnetic resonance: optimized dual sequence and reconstruction for quantification. *J Cardiovasc Magn Reson* (2017) 19:43. doi:10.1186/s12968-017-0355-5

Example prior art on machine learning methods includes:

1. Ronneberger O, Fischer P, Brox T. U-Net: Convolutional Networks for Biomedical Image Segmentation. in *Medical Image Computing and Computer-Assisted Intervention—MICCAI* 2015, eds. N. Navab, J. Hornegger, W. M. Wells, A. F. Frangi (Cham: Springer International Publishing), 234-241.
2. Scannell C M, Veta M, Villa A D M, Sammut E C, Lee J, Breeuwer M, Chiribiri A. Deep-Learning-Based Preprocessing for Quantitative Myocardial Perfusion MRI. *J Magn Reson Imaging* (2020) 51:1689-1696. doi: 10.1002/jmri.26983
3. He K, Zhang X, Ren S, Sun J. Delving Deep into Rectifiers: Surpassing Human-Level Performance on ImageNet Classification. in *Proceedings of the IEEE International Conference on Computer Vision (ICCV)* (2015)
4. Kingma D P, Ba J. Adam: A Method for Stochastic Optimization. *Proc 3rd Int Conf Learn Represent* (2014)

An alternative MR imaging system and process which is able to provide arterial input function without undergoing the complicated dual bolus protocol and is more widely accessible than the dual sequence method would therefore be desirable.

SUMMARY OF INVENTION

The present disclosure presents a machine learning system that is capable of predicting the true arterial input function during first pass perfusion experiments using a single high dosage bolus of Gadolinium and any sequence (including single sequence and dual sequence and dynamic T1 mapping sequences). In particular the present disclosure relates to the concept of using a machine learning algorithm trained using reference standard dual bolus or dual sequence data obtained from a large number (at least several dozen to (more preferably) several thousand) of dual bolus or dual sequence scans to predict the unsaturated arterial input function from a single bolus injection of contrast agent. Additionally, the present disclosure relates to the concept of using machine learning techniques to predict the dual bolus or the dual sequence AIF starting from any of the other imaging types (dual sequence, dual bolus, or saturate single sequence images). Such a technique allows quantitative analysis to be applied to single bolus single sequence scans, obviating the need for labour and time intensive dual bolus protocols and for proprietary dual sequence acquisitions, for which there is variable industry support, and which are generally only available for research, rather than clinical, purposes. A second advantage of this technique is that it allows retrospective quantification of existing single bolus perfusion datasets (multicentre studies) where quantitative perfusion methods were not used due to time/cost limitations. Moreover, such technique allows quantitative analysis methods developed for dual bolus or for dual sequence data analysis to be applied to the other type of source data. In a different embodiment, the machine learning algorithm may be trained using a different imaging or sampling modality.

In view of the above, examples of the present disclosure include a method and system for deriving a computer implemented trained artificial intelligence (AI) model that is capable of predicting an arterial input function (AIF) from blood and myocardial signal intensity curves of a subject obtained using a magnetic resonance (MR) scanner during injection of a single high dosage bolus of contrast agent that would otherwise cause signal saturation. The method and system requires an input data set of a large number of prior obtained dual bolus sets of scan measurements, for example at least 10, or at least 100, or at least 1000, or most preferably at least 5000 prior obtained dual bolus or dual sequence, or both, sets of measurements, to be used as training data for the AI model. Obtaining such a large set of dual bolus or dual sequence, or both, training data represents a significant investment. The AI model to be trained may, for example, be a form of neural network, such as for example, a convolutional neural network (CNN). Once the computer implemented trained AI model has been obtained, it may be deployed in a further method and system which receives MR data for a particular subject for which the AIF is to be found, the MR data being obtained from an MR scan taken during injection of a single bolus of contrast agent at a concentration sufficient to give MR signal saturation. The trained AI model is then able to predict, from the single bolus saturated MR data, the AIF for the subject. Once the AIF has been found, it may then further be used to determine various myocardial perfusion parameters for the subject, such as myocardial blood flow. Alternatively, the trained AI model may be utilised to convert any time of data, acquired for instance with a dual sequence or with a dual bolus or with a single sequence, into any of the other types of dataset, should this be required for further analysis.

In view of the above, from a first aspect there is provided a computer implemented method of generating a trained machine learning model capable of predicting arterial input function parameters of a subject, the method comprising: receiving a training data set comprising a plurality of sets of cardiac magnetic resonance (CMR) scan data sets obtained using a dual bolus or dual sequence contrast agent CMR imaging protocol and associated arterial input function parameters obtained therefrom; and either alternatively or additionally: i) training a machine learning model using the training data set to provide a trained artificial intelligence model capable of predicting arterial input function parameters for a subject based on a single input CMR data set obtained using a single bolus of contrast agent; ii) training a machine learning model using the training data set to provide a trained artificial intelligence model capable of predicting the dual bolus parameters for a subject based on a single input CMR data set obtained using a single bolus of contrast agent or, alternatively, a dual sequence input CMR dataset; and/or iii) training a machine learning model using training data set to provide a trained artificial intelligence model capable of predicting the dual sequence parameters for a subject based on single input CMR data obtained using a single bolus of contrast agent or, alternatively, a dual bolus input CMR dataset; and storing and/or outputting the trained machine learning model for future use.

In one example, the machine learning model is a neural network.

In one example the arterial input function is then used to determine myocardial perfusion parameters for the subject.

In one example the training data set comprises at least 10 sets of CMR scan data sets and associated arterial input function parameters. In another example the training data set comprises at least 100 sets of CMR scan data sets and associated arterial input function parameters. In a yet further example, the training data set comprises at least 1000 sets of CMR scan data sets and associated arterial input function parameters.

In a particular example the training data set comprises at least 3000, and more preferably at least 5000, sets of CMR scan data sets and associated arterial input function parameters.

From a second aspect, there is further provided a computer implemented method of determining an arterial input function for a subject from a cardiac magnetic resonance (CMR) scan, the method comprising: acquiring saturated CMR scan data from a single CMR scan undertaken during the administration of a single bolus of contrast agent sufficient to cause MR signal saturation; inputting the saturated CMR scan data into a trained machine learning model, the trained machine learning model having been trained using a training data set comprising a plurality of sets of cardiac magnetic resonance (CMR) scan data sets obtained using a dual bolus contrast agent or a dual sequence CMR imaging protocol and associated arterial input function parameters obtained therefrom; and receiving, as an output from the trained machine learning model, data indicative of arterial input function parameters in the subject.

A different embodiment comprises the acquisition of CMR scan with dual bolus method; inputting dual bolus CMR data in a trained machine learning model, the trained machine learning model having been trained using a training data set comprising a plurality of sets of cardiac magnetic resonance (CMR) scan data sets obtained using a dual bolus contrast agent or a dual sequence CMR imaging protocol and associated arterial input function parameters obtained therefrom; and receiving, as an output from the trained machine learning model, data indicative of dual sequence CMR data in the subject.

A further embodiment comprises the acquisition of CMR scan with dual sequence methods; inputting dual bolus or dual sequence CMR data in a trained machine learning model, the trained machine learning model having been trained using a training data set comprising a plurality of sets of cardiac magnetic resonance (CMR) scan data sets obtained using a dual bolus contrast agent or a dual sequence CMR imaging protocol and associated arterial input function parameters obtained therefrom; and receiving, as an output from the trained machine learning model, data indicative of dual bolus arterial input function parameters in the subject.

In one example the data indicative of the arterial input function parameters comprises a simulated or predicted non saturated MR data set corresponding to an MR data set that would have been obtained from the subject had a diluted bolus of contrast agent which did not cause MR signal saturation been used during the scan of the subject or, alternatively, an MR data set that would have been obtained from the subject using a dual sequence approach.

In one example the arterial input function parameters for the subject are derived from the simulated or predicted non saturated MR data set, and the acquired saturated CMR scan data.

In one example the arterial input function parameters include the myocardial perfusion parameters for the subject.

In one example the trained machine learning model is a trained neural network. Preferably, the trained machine learning model is trained according to the method of any of the previous aspect.

In one example the acquiring comprises undertaking a single CMR scan of the subject using an MR scanner, the subject having had administered a single bolus of contrast agent sufficient to cause MR signal saturation prior to undertaking the scan.

A further aspect of the present disclosure provides a system for generating a trained machine learning model capable of predicting arterial input function parameters of a subject, the system comprising:
  a processor; and
  a computer readable medium storing computer readable instructions that when executed by the processor cause the system to operate in accordance with the method of the first aspect described above.

A further aspect of the present disclosure provides a system for determining arterial input function parameters for a subject from a cardiac magnetic resonance (CMR) scan, the system comprising:
  a processor; and
  a computer readable medium storing computer readable instructions that when executed by the processor cause the system to operate in accordance with the method of the second aspect described above.

Further features and aspects of the invention will be apparent from the appended claims.

BRIEF DESCRIPTION OF THE DRAWINGS

Further features and advantages of the present invention will become apparent from the following description of an embodiment thereof, presented by way of example only, and by reference to the drawings, wherein like reference numerals refer to like parts, and wherein.

DESCRIPTION OF THE EMBODIMENTS

Figure 1:
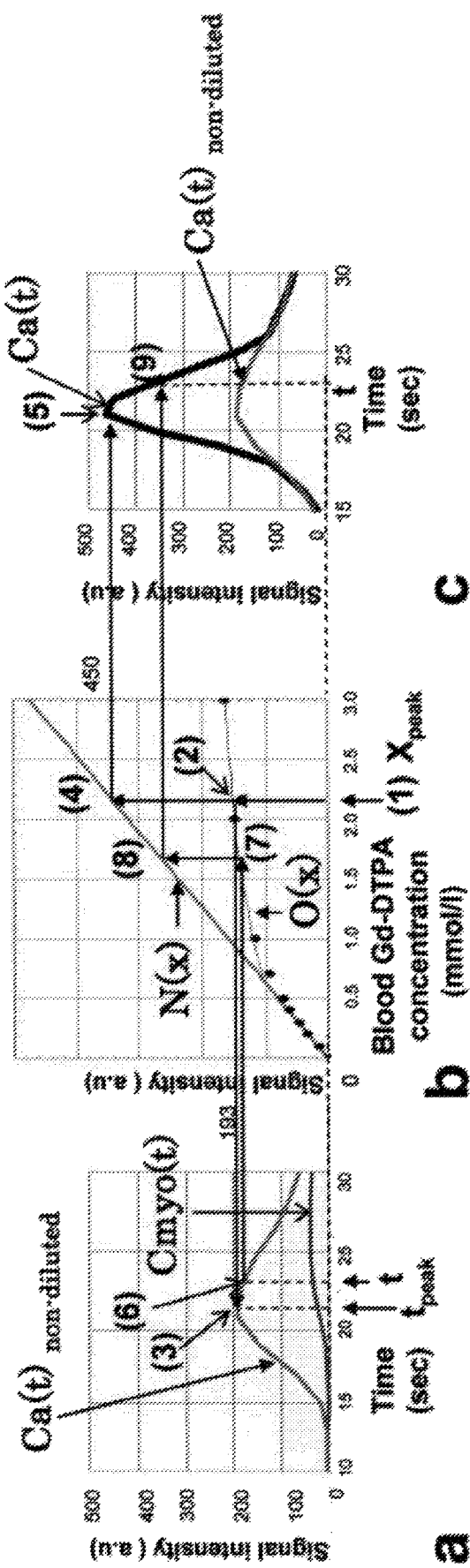
FIG. 1 is sequence of images from the Ichihara et al document referred to above illustrating how blood input function can be corrected.
Figure 2:
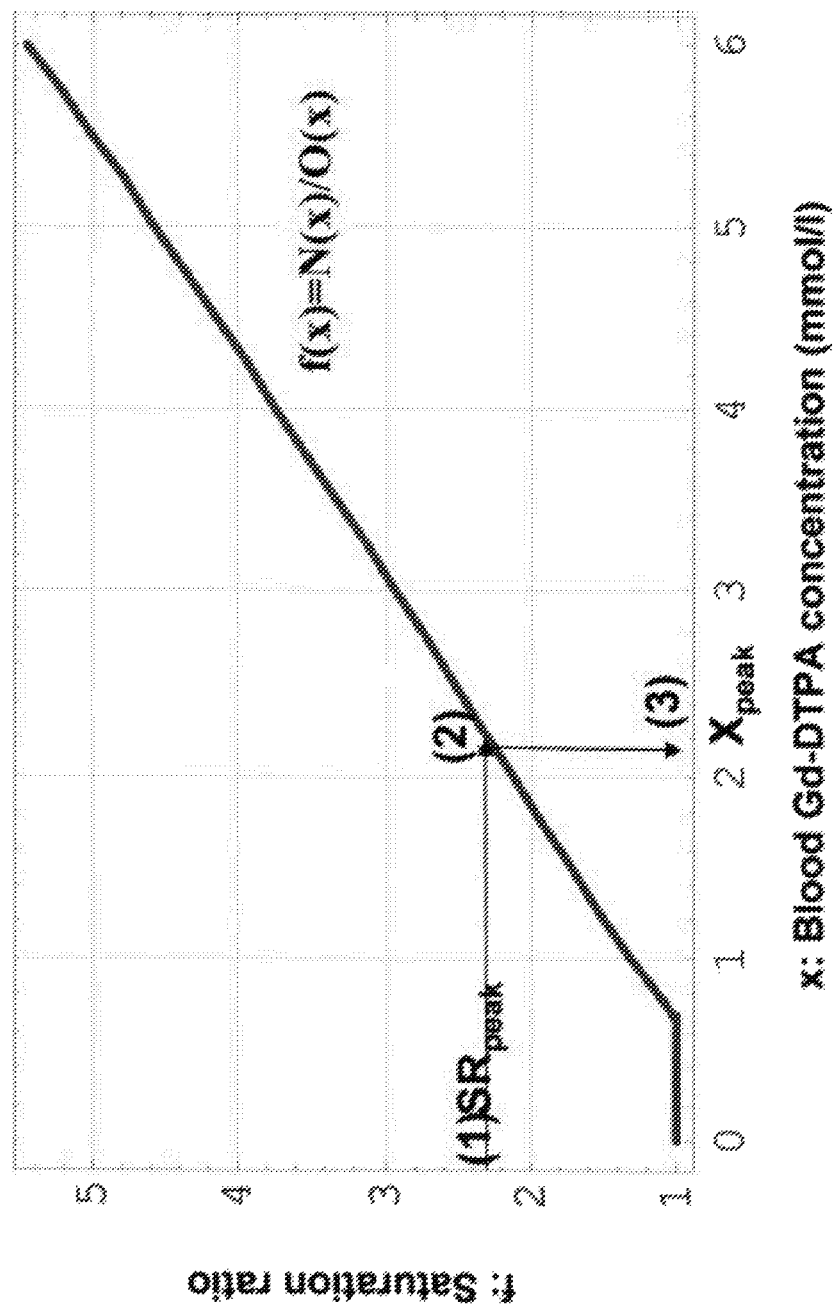
FIG. 2 is an image from the Ichihara et al document illustrating the relationship between saturation ratio and blood contrast agent concentration.

As noted in the introduction, previously in order to obtain information about myocardial blood flow then dual bolus scans involving two scans, each involving injections of respective bolus of contrast agent or, alternatively, the acquisition of a dual sequence scan were required. Alternative protocols include performing only a single extended scan, during which the two injections are administered. As explained previously, such dual bolus imaging protocols are difficult and costly to administer and such dual sequence acquisitions are not universally available. It would therefore be much more convenient and allow for less time intensive and hence lower cost myocardial perfusion scans if only a single injection and associated scan could be performed. Examples of the present disclosure provide such a single scan, single injection, imaging protocol, with then subsequent analysis and interpretation of the single injection results being undertaken by a computer implemented trained artificial intelligence network to obtain myocardial perfusion information relating to the scanned subject, such as, for example, the subject's arterial input function.

In particular, in one example embodiment, starting from more than 3,000 dual-bolus or dual sequence perfusion scans obtained at great expense over several years within hospitals, the inventors have used this scan data as a training corpus to train computer implemented AI models to provide a machine learning algorithm that can predict the non-saturated arterial input function from a routinely acquired standard single bolus sequence. In particular, in some embodiments the network is trained on the basis of in excess of 3,000 to 5000 cardiac MRI scans where a dual bolus or a dual sequence protocol was used for obviating the problem of signal saturation. The non-saturated data from the pre-bolus or dual sequence scans in the training corpus were used to create a reference standard non-saturated arterial input function, and the network trained to predict this curve from saturated first-pass input function measured on the main bolus (second injection). The result is a trained AI system, typically implemented as a neural network, which is able to receive a routinely acquired saturated single bolus sequence, and find the AIF, for the subject. The same trained AI system is also able to receive data acquired with either the dual bolus or the dual sequence method, and to predict the other type of dataset (dual sequence or dual bolus, respectively). From the AIF other myocardial perfusion parameters such as myocardial blood flow can be found. The primary advantage thus obtained is thus that there is then no longer any need to perform the complicated and costly dual bolus double scan, and instead a single scan, using a single concentrated bolus to provide signal saturation, can be undertaken instead. Moreover, the capability to convert acquired CMR data between any of the different types of datasets (single bolus, dual bolus, and dual sequence) allows the generation of data which are best suited to the analysis software in use to the calculate perfusion parameters. The cost savings from such a technique are immense, as well as the social and health benefits in allowing myocardial perfusion measurements to be undertaken in less sophisticated healthcare provision environments.

Figure 3:
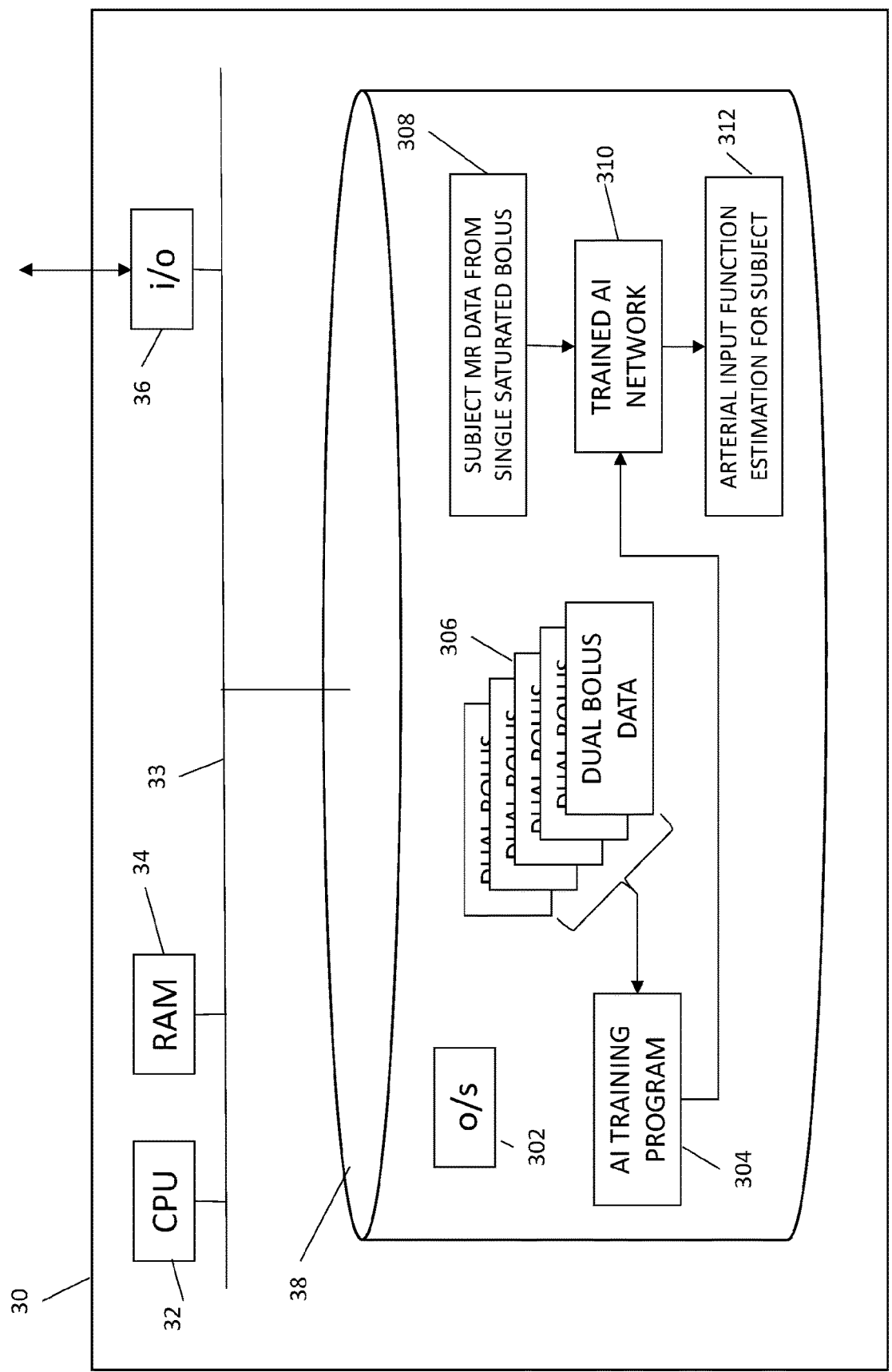
FIG. 3 is a system block diagram of a first embodiment of the present disclosure.

Embodiments of the invention are shown in FIGS. 3 to 6 Referring first to FIG. 3, a computer system 30, which may be any general purpose computer system, is provided, having a processor 32, memory 34, and input and output interfaces 36 to communicate with input and output peripherals such as displays, keyboards, a mouse, speakers, network connections etc., all of which communicate via a common bus 33. Also provided is a non-volatile computer readable storage medium 38 such as a hard disk drive, a solid state drive, flash memory or the like, on which is stored the operating system 302 for the computer system 30, as well as any other software and data required by the computer system 30 to operate. Specific to the present embodiment, however, also provided is an AI training program 304, which receives as its input the training corpus of prior acquired dual bolus or dual sequence data 306. As noted previously, the dual bolus data or dual sequence data 306 is the perfusion scan data from several previously performed dual bolus or dual sequence scans. In the present embodiment, the inventors have been carefully collecting dual bolus and dual sequence scan data to form such a training corpus for several years, and preferably at least 5000 sets of dual bolus or dual sequence scan data form the training corpus 306. However, in other embodiments the training corpus 306 may be made from fewer sets of dual bolus or dual sequence data, for example at least 10 sets, or at least 100 sets, or at least 1000 sets, although it should be generally understood that the more sets of dual bolus or dual sequence data that is used as the training corpus 306 then the more accurate the resulting model that is obtained. Obtaining a sufficient number of dual bolus or dual sequence sets of MR scans to allow the AI training program to train a network sufficiently well to function as a trained AI network 310 requires a significant investment of time, resources, and discipline to build up a significant training library of dual bolus or dual sequence scan data.

Figures 4, 5:
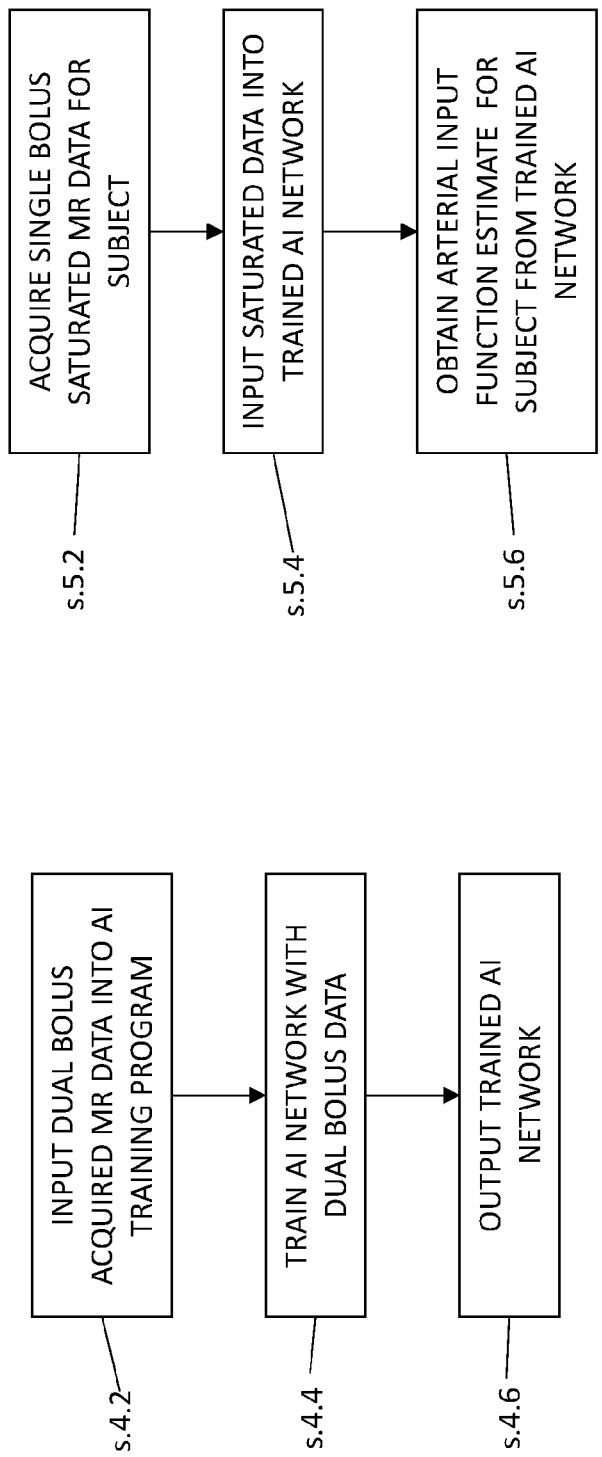
FIG. 4 is a flow diagram of the operation of part of the first embodiment.
FIG. 5 is a flow diagram of the operation of another part of the first embodiment.

As shown in FIG. 4, in operation the AI training program 304 receives the training corpus 306 as training data, and at step 4.4 uses the training corpus 306 to train a machine learning system, such as a neural network, in order to provide the trained machine learning network 310, which is then output and stored on the storage medium 38 at step 4.6 ready for use.

Having obtained the trained AI network 310, which it will be recalled is a trained neural network which has been trained using dual bolus or dual sequence scans and resulting myocardial tissue perfusion scan result, it is then possible to input myocardial MR scan data 308 obtained during injection of a single bolus of contrast agent into a subject at a concentration that gives signal saturation, and then obtain from the network as an output a corrected subject arterial input function 312 as if they were not saturated, from which, for example, a myocardial perfusion parameters can be found. Thus, as shown in FIG. 5, in order to use the trained system clinically, the first step 5.2 is to perform a single bolus cardiac magnetic resonance (CMR) scan of a subject, using a single bolus injection of contrast agent of an amount and concentration that causes MR signal saturation in at least the left ventricle. For example, a single bolus injection of non-diluted gadolinium diethylenetriamine pentaacetic acid (Gd-DTPA) as the contrast agent will cause signal saturation in the CMR scan, and provide a set of saturated data. Performing such a single scan with a single bolus injection is far easier to perform in a clinical setting than the significantly more complicated dual bolus injection and scan protocol of the prior art. Other contrast agents may also be used, such as Gd-DOTA. Generally, any MRI contrast agent may be used, but particularly Gadolinium based MRI contrast agents (GBCA).

Having obtained the saturated scan data using the single bolus and associated single scan, at step 5.4 the set of saturated scan data is input into the trained AI network 310. The trained AI network, which as noted above is typically a neural network, will then process the data and effectively output a set of corrected, non-saturated data which is akin to the scan data that would have been obtained if a diluted (e.g. 10%) Gd-DTPA contrast agent had been used in the dual bolus protocol. Because this corrected data set is not saturated then the AIF can then be found for the subject therefrom in the same manner as if it had been obtained using the dual bolus or the dual sequence protocol, at s.5.6. Effectively, then, the present embodiment replaces the dual bolus or the dual sequence protocols with a single bolus scan corresponding to the second, saturated, scan in the dual bolus protocol, and then using the trained AI network to simulate the first, non-saturated scan of the dual bolus protocol or the dual sequence scan, using the results of the single bolus scan as an input thereto. The result is that there is then obtained for the subject an actual saturated signal scan obtained using non-diluted contrast agent (which corresponds to the second scan in the dual bolus protocol), and a simulated or predicted non-saturated signal scan (which corresponds to the first scan on the dual bolus protocol) obtained from the trained AI network. These two sets of scan data (one actual, one simulated or predicted) can then be processed in exactly the same way as if they had actually been obtained using the dual bolus or the dual sequence protocol to obtain the arterial input function for the subject, from which myocardial perfusion parameters such as myocardial blood flow can then be obtained. In this way all of the benefits of the known dual bolus or duals sequence scan protocols in terms of making myocardial measurements of a human subject are obtained, but with the need to only perform a single scan.

The same trained AI network may also be used to convert data acquired with the dual bolus method in an output which simulates the dual sequence acquisition in the same subject. Similarly, the same trained AI network may also be used to convert data acquired with the dual sequence method in an output which simulates the dual bolus acquisition.

In brief summary therefore, embodiments of the invention provide a trained AI network which has been trained on either or both of a large number of dual-bolus or dual sequence scans. Once the network has been trained (on scan data of either type) a myocardial MR scan is performed using a single bolus of contrast agent injected into the subject of an amount and concentration that causes MR signal saturation. The trained AI network is then able to correct the saturated data obtained from the single bolus scan to provide corrected scan data that can then be used to find the AIF and other myocardial perfusion parameters. Of note is that the operational technique of performing the single bolus scan is the same regardless of whether the AI network was trained on dual bolus scan data, dual sequence scan data, or a mixture of the two. Once the AI network is trained the actual operational method and system of finding the AIF and myocardial perfusion parameters using a single bolus scan is agnostic to how the AI network was trained.

Figure 6:
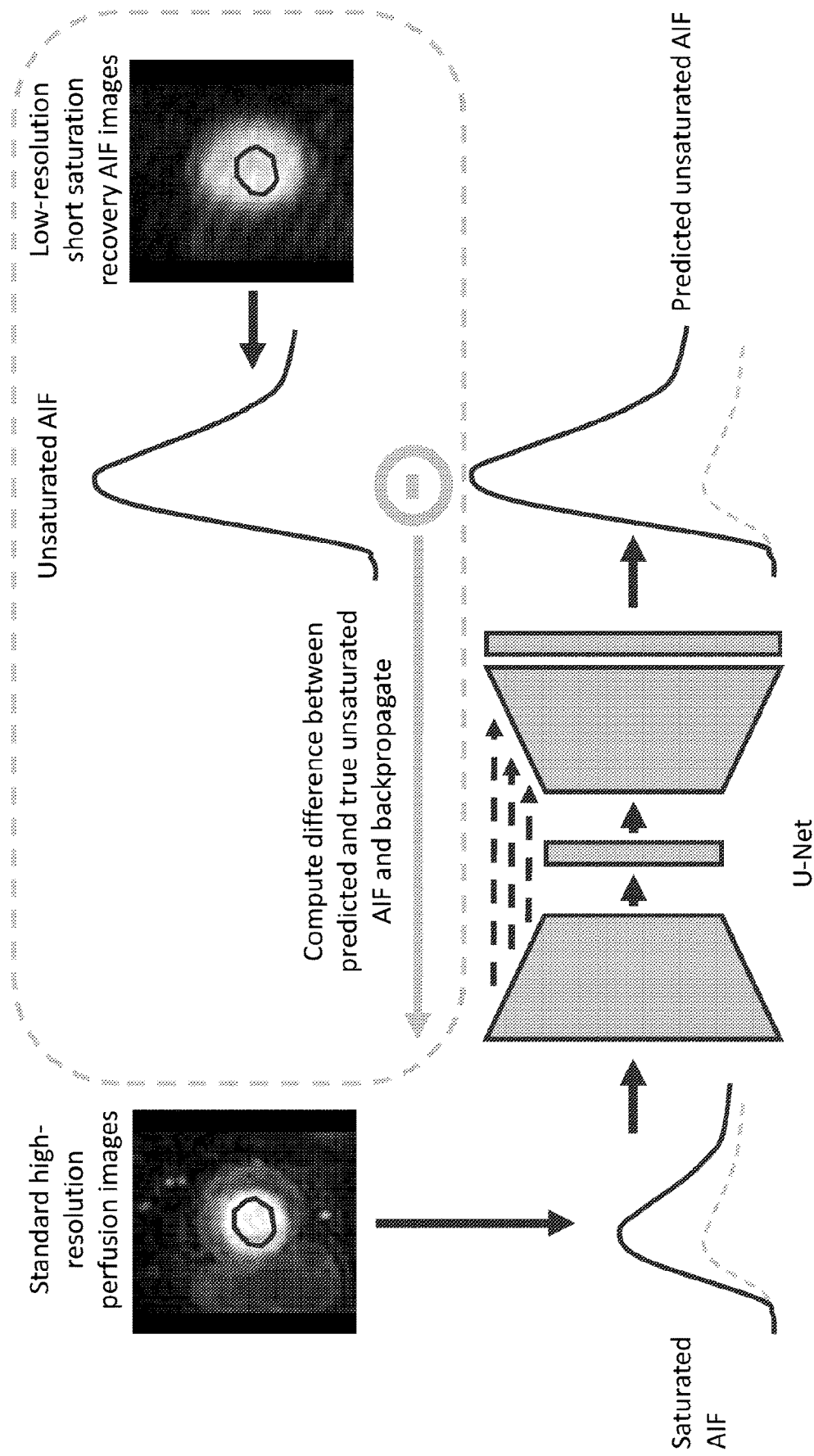
FIG. 6 is diagram of a further embodiment of the present disclosure relating to using dual sequence scans.

Whilst the above gives a full description of embodiments of the invention, FIG. 6 shows further details of the arrangement using dual sequence data to train the AI network, instead of or in addition to dual-bolus data.

The quantification of myocardial blood flow (MBF) from stress perfusion cardiac magnetic resonance (CMR) has the potential to facilitate the widespread clinical adoption of stress perfusion CMR outside of experience centres by reducing the dependence of the diagnostic accuracy on the level of training of the operator. However, one of the major challenges of MBF quantification that is still to be overcome is the sampling of the arterial input function (AIF) as required for the tracer-kinetic modelling.

The AIF is typically sampled from the basal left ventricular (LV) blood pool but there is known to be a non-linear relationship between the concentration of gadolinium and the measured MR signal, particularly at high concentrations and thus, on the standard acquisitions, the measured signal in the LV is saturated. As described above, a solution to this is the use of a dual saturation acquisition sequence (FIG. 6). In this approach, a short saturation time (23.5 ms) is used to acquire a low-resolution AIF slice without signal saturation and the myocardium information is subsequently acquired with a standard higher resolution acquisition with longer saturation time (100 ms) in three short axis slices. The tracer-kinetic modelling can then be performed with the short saturation time AIF and the myocardial tissue curves from the standard acquisition slices.

The limitation of the dual sequence approach is the lack of availability of the pulse sequence for routine clinical use. There are several research prototypes in use but these are not commercially available and therefore, the approach is limited to use in highly specialised centres.

As described previously, the hypothesis of this work is that a deep learning model can be trained to predict the unsaturated AIF from a saturated standard acquisition AIF. In particular, we trained a 1D U-Net convolutional network (CNN) with the data from more than 150 stress perfusion CMR scans where a dual sequence acquisition was used for the correction of AIF saturation. The unsaturated data from the short saturation acquisition are used to create a reference standard unsaturated AIF and the network was trained to predict this curve from saturated AIF sampled from the standard acquisition. In other embodiments, data acquired by both dual sequence and dual bolus scans may be used to train the network.

As shown in FIG. 6, the saturated AIF is extracted from an automatically computed region of interest in the LV blood pool in the standard high-resolution cardiac MR images (shown in red with the corresponding myocardium signal-intensity curve, green dashed line, shown for scale) which is input to the CNN to predict the AIF without signal saturation. For the training process (grey-dashed region), the ground-truth AIF is extracted from a corresponding low-resolution short saturation recovery acquisition. The reference standard unsaturated AIF is compared to the predicted unsaturated AIF and used to update the networks weights.

The training database, therefore, consists of the 1D time curves of paired saturated and unsaturated AIFs extracted from dual sequence acquisitions. The values of both the AIFs are normalised by the maximum of the saturated AIF for both training and inference, and can be later correspondingly unnormalised to allow MBF quantification. The curves are interpolated in this example to have a time resolution of 0.5 s and cropped to leave 64 time points.

The U-Net model takes as input the saturated AIF and consists of 5 resolution steps, with each resolution step consisting of two 1D convolutional blocks with batch normalisation, ReLU activations, and dropout (probability=0.2). 1D max-pooling and transposed convolutions are used for down and upsampling respectively. The model was initialised with He normal weights (3) and was trained for 20,000 iterations, with a batch size of 10 using the ADAM optimization algorithm (learning rate: 0.001) to minimise the mean squared error (MSE) between the predicted and reference standard unsaturated AIFs.

The training results in a model that is capable of predicting the unsaturated AIF from stress perfusion CMR scans using a single high dose bolus of Gadolinium and a single saturation sequence, as described above.

Various modifications to the above may be made to provide further examples. For example, whilst in the above we have described that both the generation of the trained AI network 310 and the operation of the AI network 310 to predict AIF parameters from the acquired single scan are performed on the same computer system 30, in other example embodiments that need not be the case, and they may be performed on different machines, at different times. In clinical applications of the present invention the trained AI network would be generated just once, and then copies of the trained AI network together with suitable input and output and control interface software distributed to hospitals and scanning centers for actual clinical use. That is, the AI network only requires training once, and then once trained copies may be made for distribution and practical use in undertaking single scan clinical studies.

In addition, as another modification, in the above we describe the AI network as being a neural network, such as a convolutional neural network. In other embodiments the trained AI network may be any machine learning technology that is able to repeatedly simulate the operation of a complicated non-linear system. In this respect, the relationship between the saturated MR scan results and the non-saturated MR scan results in the dual bolus protocol is complicated and non-linear, such that the inventors have found a neural network to be the most effective way of modelling it. However, other non-linear simulation models may also be used, such as Ordinary Kriging, or Support Vector Regression models, that are capable of modelling the non-linear relationship between the saturated and non-saturated scan data sets. In other embodiments, different imaging and non-imaging methods could be used as a means to provide non-saturated reference standard datasets for the training of the AI network. Examples of these methods include but are not limited to other imaging modalities (i.e. positron emission tomography (PET), single photon emission computed tomography (SPECT), computed tomography (CT), x-ray fluoroscopy, echography, and others) or non imaging-based measurement systems (i.e. thermocouples, optical systems, radioactivity detectors, and others).

Various further modifications to the above described examples, whether by way of addition, deletion or substitution, will be apparent to the skilled person to provide additional examples, any and all of which are intended to be encompassed by the appended claims.

The invention claimed is:

1. A computer implemented method of generating a trained machine learning model capable of predicting arterial input function parameters of a subject, the method comprising:
receiving a training data set comprising a plurality of sets of: (i) cardiac magnetic resonance (CMR) scan data sets obtained using a dual bolus contrast agent CMR imaging protocol and/or a dual sequence CMR imaging protocol, the CMR scan data sets comprising:
first CMR scan data obtained from a CMR scan undertaken during the administration of a first bolus of diluted contrast agent which does not cause MR signal saturation, and second CMR scan data obtained from a CMR scan undertaken during the administration of a second bolus of contrast agent, the second bolus of contrast agent having a concentration which causes MR signal saturation, and (ii) arterial input function parameters, the CMR scan data sets having associated arterial input function parameters obtained from the CMR scan data sets;
training a machine learning model using the training data set to provide a trained artificial intelligence model capable of predicting arterial input function parameters for a subject based on a single input CMR data set obtained from a single CMR scan of the subject undertaken during the administration of a single bolus of contrast agent sufficient to cause MR signal saturation; and
storing and/or outputting the trained machine learning model for future use.

2. The method according to claim 1, wherein the machine learning model is a neural network.

3. The method according to claim 1, wherein the arterial input function is then used to determine myocardial perfusion parameters for the subject.

4. The method according to claim 1, wherein the training data set comprises at least 10, more preferably at least 100, 1000, 3000 or 5000 sets of CMR scan data sets and associated arterial input function parameters.

5. The method according to claim 1, wherein the training data set comprises at least 100 sets of CMR scan data sets and associated arterial input function parameters.

6. The method according to claim 1, wherein the training data set comprises at least 1000 sets of CMR scan data sets and associated arterial input function parameters.

7. The method according to claim 1, wherein the training data set comprises at least 3000, and more preferably at least 5000, sets of CMR scan data sets and associated arterial input function parameters.

8. The method according to claim 1, wherein the dual bolus CMR dataset is derived from dual sequence CMR dataset or vice versa.

9. A computer implemented method of determining an arterial input function for a subject from a cardiac magnetic resonance (CMR) scan, the method comprising:
acquiring saturated CMR scan data from a single CMR scan of the subject undertaken during the administration of a single bolus of contrast agent sufficient to cause MR signal saturation;
inputting the saturated CMR scan data into a trained machine learning model, the trained machine learning model having been trained using a training data set comprising a plurality of sets of: (i) cardiac magnetic resonance (CMR) scan data sets obtained using a dual bolus contrast agent CMR imaging protocol and/or a dual sequence CMR imaging protocol, the CMR scan data sets comprising: first CMR scan data obtained from a CMR scan undertaken during the administration of a first bolus of diluted contrast agent which does not cause MR signal saturation, and second CMR scan data obtained from a CMR scan undertaken during the administration of a second bolus of contrast agent, the second bolus of contrast agent having a concentration which causes MR signal saturation, and (ii) arterial input function parameters, the CMR scan data sets having associated arterial input function parameters obtained from the CMR scan data sets; and
receiving, as an output from the trained machine learning model, a prediction of arterial input function parameters in the subject.

10. The method according to claim 9, wherein the prediction of the arterial input function parameters comprises a simulated or predicted non saturated MR data set corresponding to an MR data set that would have been obtained from the subject had a diluted bolus of contrast agent which did not cause MR signal saturation been used during the scan of the subject.

11. The method according to claim 9, wherein the prediction of the arterial input function parameters comprises a simulated or predicted non saturated MR data set corresponding to an MR data set that would have been obtained from the subject had a dual sequence acquisition method been used during the scan of the subject.

12. The method according to claim 10, wherein the arterial input function parameters for the subject are derived from the simulated or predicted non saturated MR data set, and the acquired saturated CMR scan data.

13. The method according to claim 9, wherein the dual bolus CMR dataset is derived from dual sequence CMR dataset.

14. The method according to claim 9, wherein the dual sequence CMR dataset is derived from dual bolus CMR dataset or vice versa.

15. The method according to claim 9, wherein the arterial input function parameters include the arterial input function for the subject.

16. The method according to claim 9, wherein the trained machine learning model is a trained neural network.

17. The method according to claim 9, wherein the trained machine learning model is trained by:
receiving a training data set comprising a plurality of sets of cardiac magnetic resonance (CMR) scan data sets obtained using a dual bolus contrast agent CMR imaging protocol and/or a dual sequence CMR imaging protocol and associated arterial input function parameters obtained therefrom;
training a machine learning model using the training data set to provide a trained artificial intelligence model capable of predicting arterial input function parameters for a subject based on a single input CMR data set obtained using a single bolus of contrast agent; and
storing and/or outputting the trained machine learning model for future use.

18. The method according to claim 9, wherein the acquiring comprises undertaking a single CMR scan of the subject using an MR scanner, the subject having had administered a single bolus of contrast agent sufficient to cause MR signal saturation prior to undertaking the scan.

19. A system for generating a trained machine learning model capable of predicting arterial input function parameters of a subject, the system comprising:
a processor; and
a computer readable medium storing computer readable instructions that when executed by the processor cause the system to operate to:
receive a training data set comprising a plurality of sets of:
(i) cardiac magnetic resonance (CMR) scan data sets obtained using a dual bolus contrast agent CMR imaging protocol and/or a dual sequence CMR imaging protocol, the CMR scan data sets comprising: first CMR scan data obtained from a CMR scan undertaken during the administration of a first bolus of diluted contrast agent which does not cause MR signal saturation, and second CMR scan data obtained from a CMR scan undertaken during the administration of a second bolus of contrast agent, the second bolus of contrast agent having a concentration which causes MR signal saturation, and (ii) arterial input function parameters, the CMR scan data sets having associated arterial input function parameters obtained from the CMR scan data sets;
train a machine learning model using the training data set to provide a trained artificial intelligence model capable of predicting arterial input function parameters for a subject based on a single input CMR data set obtained from a single CMR scan of the subject undertaken during the administration of a single bolus of contrast agent sufficient to cause MR signal saturation; and
store and/or output the trained machine learning model for future use.

20. A system for determining arterial input function parameters for a subject from a cardiac magnetic resonance (CMR) scan, the system comprising:
a processor; and
a computer readable medium storing computer readable instructions that when executed by the processor cause the system to operate to:
acquire saturated CMR scan data from a single CMR scan undertaken during the administration of a single bolus of contrast agent sufficient to cause MR signal saturation;
input the saturated CMR scan data into a trained machine learning model, the trained machine learning model having been trained using a training data set comprising a plurality of sets of (i) cardiac magnetic resonance (CMR) scan data sets obtained using a dual bolus contrast agent CMR imaging protocol and/or a dual sequence CMR imaging protocol, the CMR scan data sets comprising: first CMR scan data obtained from a CMR scan undertaken during the administration of a first bolus of diluted contrast agent which does not cause MR signal saturation, and second CMR scan data obtained from a CMR scan undertaken during the administration of a second bolus of contrast agent, the second bolus of contrast agent having a concentration which causes MR signal saturation, and (ii) arterial input function parameters, the CMR scan data sets having associated arterial input function parameters obtained from the CMR scan data sets; and
receive, as an output from the trained machine learning model, data indicative of arterial input function parameters in the subject.

* * * * *